(12) United States Patent
Bickham (10) Patent No.: US 7,558,480 B2
(45) Date of Patent: Jul. 7, 2009

(54) UNREPEATERED OPTICAL COMMUNICATION SYSTEM WITH SUPPRESSED SBS

(75) Inventor: Scott R. Bickham, Corning, NY (US)

(73) Assignee: Corning Incorporated, Corning, NY (US)

( * ) Notice: Subject to any disclaimer, the term of this patent is extended or adjusted under 35 U.S.C. 154(b) by 428 days.

(21) Appl. No.: 10/837,853

(22) Filed: May 3, 2004

(65) Prior Publication Data

US 2005/0025501 A1    Feb. 3, 2005

Related U.S. Application Data

(60) Provisional application No. 60/492,006, filed on Jul. 31, 2003.

(51) Int. Cl.
  H04B 10/00 (2006.01)
  H04B 10/08 (2006.01)
  H04B 10/12 (2006.01)
  H04J 14/02 (2006.01)

(52) U.S. Cl. ............... 398/37; 398/29; 398/81; 398/147; 398/159

(58) Field of Classification Search .......... 398/28, 398/29, 38, 81, 142, 147, 158, 178, 159
See application file for complete search history.

(56) References Cited

U.S. PATENT DOCUMENTS

| | | | | |
|---|---|---|---|---|
| 5,561,553 A | 10/1996 | Marcerou et al. | ......... | 359/341 |
| 5,854,698 A | 12/1998 | Eskildsen et al. | ......... | 359/119 |
| 6,344,923 B1 | 2/2002 | Blondel et al. | ......... | 359/334 |
| 6,396,987 B1 | 5/2002 | De Montmorillon et al. | ......... | 385/123 |
| 6,477,288 B1 * | 11/2002 | Sato | ......... | 385/16 |
| 6,516,113 B1 | 2/2003 | Glingener et al. | ......... | 385/24 |
| 6,529,672 B1 | 3/2003 | Blondel et al. | ......... | 385/140 |
| 6,535,315 B1 | 3/2003 | Way et al. | ......... | 359/180 |
| 6,606,176 B1 * | 8/2003 | Essiambre et al. | ......... | 398/158 |
| 6,674,557 B1 * | 1/2004 | DaSilva et al. | ......... | 398/79 |
| 6,748,178 B2 | 6/2004 | Miyakawa et al. | ......... | 398/148 |
| 2003/0180019 A1 * | 9/2003 | Tirloni | ......... | 385/127 |

FOREIGN PATENT DOCUMENTS

EP    1 329 751 A1    7/2003

OTHER PUBLICATIONS

Harry Newton, Newton Telecom Dictionary, Feb. 2001, CMP Books, 17th edition, pp. 516.*

Tur, M. et al, "Nonlinear properties of dispersion management modules employing high-order mode fibers", Optical Fiber Communication Conference (OFC), Technical Digest Postconference Edition, Anaheim, CA, Mar. 17-22, 2001.

Botineau et al., "*Effective stimulated Brillouin gain in singlemode optical fibers*", Electronics Letters, Nov. 9, 1995, vol. 31, No. 23, pp. 2032-2034.

(Continued)

*Primary Examiner*—Dalzid Singh
(74) *Attorney, Agent, or Firm*—Svetlana Z. Short; Joseph M. Homa (57) ABSTRACT

An optical communication system and a communication network are disclosed herein capable of transmitting optical signals with high optical launch power over unrepeatered optical fiber links. A method of transmitting optical signals is also disclosed herein which comprises transmitting optical signals at high optical launch power over unrepeatered links.

20 Claims, 5 Drawing Sheets

OTHER PUBLICATIONS

Guild et al., "*Unrepeatered transmission over 415km at 2.5 Gbit/s with Raman gain and +26.5 dBm launch power*", Electronics Letters. vol. 32, No. 22, Oct. 24, 1996, pp. 2087-2088.

Brandon et al., "*Raman Limited, Truly Unrepeatered Transmission at 2.5 Gbit/s over 453 km with 30 dBm Launch Signal Power*", ECOC '98, Sep. 20-24, 1998, Madrid, Spain, pp. 563-564.

Chen et al., "*Self-Phase-Modulation-Limited Transmission Distance of Repeaterless 1.55 µm Multi-channel AM-VSB External Modulation systems*", SPIE Conference on Optical Fiber Communication. vol. 3420, Taipei, Taiwan, Jul. 1998, pp. 138-145.

Ylä-Jarkko, et al., "Achieving Long Repeaterless Sections in High-Density Metropolitan WDM Networks", IEEE Photonics Technology Letters, vol. 14, No. 7, Jul. 2002, pp. 1013-1015.

Lee, et al., "Repeaterless Transmission of 80-Channel AM-SCM Signals Over 100-km Large-Effective-Area Dispersion-Shifted Fiber", IEEE Photonics Technology Letters, vol. 12, No. 2, Feb. 2000, pp. 341-343.

Ohkawa, et al., "Bit-Dependent Degradation Caused by Stimulated Brillouin Scattering in CPFSK Coherent Optical Repeaterless Systems with Booster Amplifiers", Journal of Lightwave Technology, vol. 13, No. 5, May 1995, pp. 914-922.

Sano, et al., "10Gbit/s, 300km repeaterless transmission with SBS suppression by the use of the RZ format", Electronics Letters, Sep. 29, 1994, vol. 30, No. 20, pp. 1694-1695.

Park, et al., "A 5 Gb/s Repeaterless Transmission System Using Erbium-Doped Fiber Amplifiers", IEEE Photonics Technology Letters, vol. 5, No. 1, Jan. 1993, pp. 79-82.

Sugie, "Impact of SBS on CPFSK Coherent Transmission Systems Using Dispersion-Shifted Fiber", IEEE Photonics Technology Letters, vol. 5, No. 1, Jan. 1993, pp. 102-105.

Sugie, et al., "A Novel Repeaterless CPFSK Coherent Lightwave System Employing an Optical Booster Amplifier", Journal of Lightwave Technology, vol. 9, No. 9, Sep. 1991, pp. 1178-1186.

Sugie, "Transmission Limitations of CPFSK Coherent Lightwave Systems Due to Stimulated Brillouin Scattering in Optical Fiber", Journal of Lightwave Technology, vol. 9, No. 9, Sep. 1991, pp. 1145-1155.

Eskildsen, "465-km Repeaterless Transmission Using a 2.488 Gb/s Directly Modulated DFB Laser", IEEE Photonics Technology Letters, vol. 8, No. 5, May 1996, pp. 724-726.

Hansen, et al., "442km repeaterless transmission in a 10Gbit/s system experiment", Electronics Letters, May 23, 1996, vol. 32, No. 11, pp. 1018-1019.

Horiuchi, et al., Stimulated Brillouin scattering suppression effects induced by cross-phase modulation in high power WDM repeaterless transmission, Electronics Letters, Feb. 19, 1998, vol. 34, No. 4, pp. 390-391.

\* cited by examiner

UNREPEATERED OPTICAL COMMUNICATION SYSTEM WITH SUPPRESSED SBS

CROSS-REFERENCE TO RELATED APPLICATIONS

This application claims the benefit of priority under 35 U.S.C. § 119(e) of U.S. Provisional Application Ser. No. 60/492,006 filed on Jul. 31, 2003.

BACKGROUND OF THE INVENTION

1. Field of the Invention

This invention relates to optical transmission systems and more specifically to a fiber optic transmission system capable of carrying a broadband signal over single mode optical fiber with high optical launch power.

2. Technical Background

Long haul submarine optical fiber cable systems having optical cable spans underwater are typically deployed between continents and or along the coastline of continents. Repeatered submarine systems employ repeaters along their length. A repeater is a unit typically in the form of an enclosed box, which contains an amplifier to boost signal strength and an equalizer to correct distortion. Typically such repeaters are placed at intervals along the submarine optical cable to allow longer cables to be used and/or to increase system reach. Typically, repeaters contain at least one electrical component.

As used herein, "active repeater" refers to a repeater having at least one electrical component, and "unrepeatered" or "repeaterless" refers to the absence of active repeaters.

Unrepeatered systems typically do not extend further than about 500 kilometers, and in most instances are considerably shorter than 500 kilometers. Unrepeatered systems are very often used in festoon applications, wherein the optical cable is disposed between a transmitter and receiver at different locations, for example along a coastline with the festoon optical fiber being deployed under water between the transmitter and receiver.

Unrepeatered systems play a valuable role in linking markets, particularly markets separated by distances of 100 to 500 km. For example, festoon systems comprised of undersea networks are used to connect islands or to circumvent difficult geological impediments or unstable political routes. Several unrepeatered systems have been installed on long overland routes that do not require add/drop capabilities but could use branching units. Such applications offer a method of transmitting optical signals over several hundred kilometers.

Fiber attenuation losses in an unrepeatered system can be on the order of, for example, approximately 20-60 dB when span lengths of 100-300 km are employed for a fiber having an attenuation of 0.20 dB/km. Signal to noise constraints generally constrain system lengths to less than about 220 km when the sole source of amplification is an EDFA at the transmitter. The addition of distributed Raman amplification may increase the maximum length by 50 to 130 km. Raman pump lasers are usually backward-propagating from the receiver end, but forward pumping may also be employed. Distances of 350-500 km can be achieved through the use of one or more Remote Optically Pumped Amplifiers (ROPAs), which consist of a length of Erbium-doped fiber which is spliced into the transmission path and pumped using the same fiber or an additional length of fiber that is optically coupled to the transmission fiber near the Erbium-doped section.

The most commonly used fiber in unrepeatered systems has been conventional single mode fiber because of its combination of low attenuation, effective area of about 80 μm² at 1550 nm, low price and wide availability. Such standard singlemode fiber may be comprised of a germania doped silica fiber, such as Corning SMF-28™ fiber, or pure silica core fiber. More recently, large effective area cutoff-shifted fibers such as Corning Vascade® L1000 have become available, which offer an effective area of about 101 μm² at 1550 nm.

The need to increase the channel count per fiber requires higher power handling capacity. Increasing the maximum distance, or reach, requires higher input powers, which in turn increases single channel nonlinearities such as self-phase-modulation (SPM) and Stimulated Brillouin scattering (SBS). For a given optical fiber effective area, decreasing the channel spacing results in increased penalties from inter-channel effects such as cross-phase modulation (XPM) and four-wave-mixing (FWM), particularly at bit rates of 10 Gb/s and higher. An increase in the fiber effective area reduces both single-channel and inter-channel nonlinearities.

The transmission of digital signals over long unrepeatered distances requires the use of high power optical amplifiers, therefore giving rise to concerns about SBS suppression and self-phase modulation (SPM). See Y. Aoki et al., "Non-repeatered long distance transmission systems with remote pumping and WDM technologies," pp. 555-563, Proceedings of 1997 SubOptic Conference. Stimulated Brillouin scattering (SBS) is a nonlinear optical effect that poses a significant restriction to the amount of narrow-linewidth optical power that can be launched into a long length of single mode optical fiber. For a given length of single-mode fiber with a given attenuation coefficient at the chosen optical wavelength, there is an optical-linewidth-dependent threshold power below which SBS does not occur. For standard commercially available telecommunication fiber operating at 1550 nm, the SBS threshold for a continuous wave (cw) optical source (laser) with an optical linewidth less than 10 MHz is less than 7 dBm for a fiber optic link of approximately 50 kilometer length.

SBS suppression is as typically achieved in known systems by broadening the laser linewidth or artificially spreading the signal spectrum by external phase modulation. However, broadening the signal linewidth can impact system performance by increasing the overlap of signal pulses in a single channel (SPM) or adjacent channels (XPM), while phase modulation of the signal spectrum can be converted to intensity modulation and signal distortion by nonlinearities in the system. SBS suppression in known systems appears to limit the average signal power per channel and the span length due to nonlinearities.

The maximum average channel power for known optical fiber has been mapped out as a function of transmission distance for 100 km lengths of single mode and non-zero dispersion-shifted fibers. See G. Mohs et al., "Maximum Link Length versus Data Rate for SPM Limited Transmission Systems," ECOC 2000. The SPM limit for the known fibers was found to be greater than 18 dBm for bit rates of 10 and 20 Gb/s and for various modulation formats. At 40 Gb/s, the SPM limit was greater than 15 dB for 35% RZ modulation, very near the 33% RZ used in most known unrepeatered transmission systems. System performance typically drops in known systems for average channel powers greater than about 18 dBm due to SPM and inter-channel nonlinearities. See N. H.

Taylor and W. D. Cornwell, "The Use of High Effective Area Fibre in Submarine Festoon Systems," pp. 333-336, Proceedings of SubOptic 2001.

SUMMARY OF THE INVENTION

An optical communication system is disclosed herein capable of transmitting optical signals with high optical launch power, and/or over greater distances than was previously thought possible with unrepeatered or repeaterless signal transmission. The system preferably utilizes a single-mode fiber having a high SBS threshold. Alternatively, the signal could be amplified, for example by Raman amplification or a ROPA, to further increase the system reach. The system preferably comprises an unrepeatered optical fiber link for transmitting optical data. The system enables higher optical launch powers and/or longer optical path distances from the optical signal transmitter source to a receiver.

In preferred embodiments, the system operates without the use of electronic means for SBS suppression. In other preferred embodiments, the system includes the use of electronic means for SBS suppression to further increase launch power and/or system reach beyond the limits achievable with other fibers.

Operation under a digital signal format is particularly suitable for all of the embodiments disclosed herein. Preferably, a plurality of digital signals at different wavelengths are transmitted on different channels.

As used herein, the output power of an optical signal transmitter is the input power into the optical fiber link coupled thereto.

Reference will now be made in detail to the present preferred embodiments of the invention, examples of which are illustrated in the accompanying drawings. An exemplary embodiment of a segmented core refractive index profile in accordance with the present invention is shown in each of the figures.

DETAILED DESCRIPTION OF THE PREFERRED EMBODIMENT

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. In cases where the refractive index of an annular region or a segment is less than the average refractive index of the cladding region, the relative index percent is negative and is referred to as having a depressed region or depressed index, and is calculated at the point at which the relative index is most negative unless otherwise specified.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. A zero-dispersion wavelength corresponds to a wavelength where the dispersion has a value of 0.

"Effective area" is defined as:

$$A_{\mathit{eff}} = 2\pi (\int E^2 r\, dr)^2 / (\int E^4 r\, dr),$$

where the integration limits are 0 to $\infty$, and E is the electric field associated with light propagated in the waveguide.

The mode field diameter (MFD) is measured using the Peterman II method wherein, $2w = MFD$, and $w^2 = (2\int E^2 r\, dr / \int [dE/dr]^2 r\, dr)$, the integral limits being 0 to $\infty$.

The bend resistance of a waveguide fiber can be gauged by induced attenuation under prescribed test conditions.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

An optical waveguide fiber link, as used herein, comprises an optical fiber or a plurality of optical fibers, or an optical fiber cable, or a plurality of optical fiber cables. An optical fiber cable comprises one or more optical fibers. An optical signal transmitted through an optical fiber travels through an associated optical fiber path length. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. In preferred embodiments disclosed herein, an optical fiber link consists of optical fiber or optical fiber cable with no active components.

Figure 1:
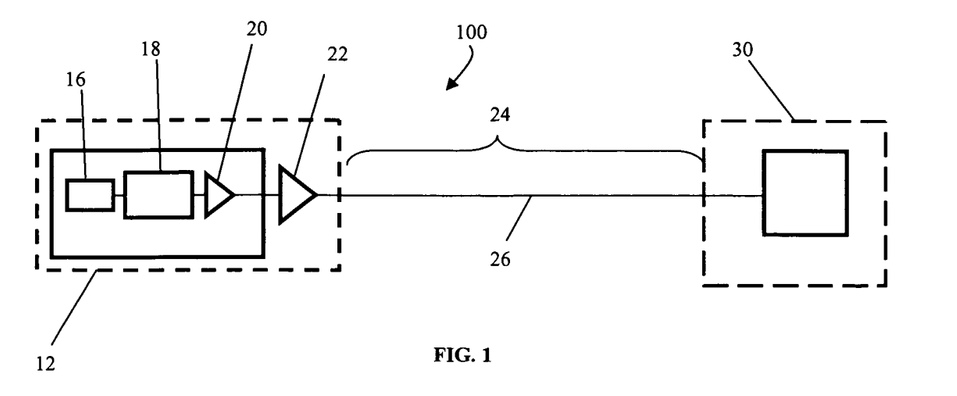
FIG. 1 schematically illustrates a preferred embodiment of a communications network for use in a system as disclosed herein.

FIG. 1 schematically illustrates a communications network 100 which can be used in a telecommunications system. The communications network 100 illustrated in FIG. 1 has an optical transmitter 12, which in the embodiment illustrated consists of distributed feedback laser 16, external modulator 18, optional pre-amplifier 20, and post-amplifier 22. Pre-amplifier 20 and post-amplifier 22 are preferably erbium-doped amplifiers, although other suitable amplifiers known to the skilled artisan could also be used. Transmitter 12 may comprise a multiplexer. The optical signal transmitter is not limited to this type and can instead be of any type capable of transmitting an optical signal. Optical transmitter 12 sends an optical signal into optical fiber link 24. In the embodiment illustrated in FIG. 1, optical fiber link 24 consists of an optical fiber span 26 which is comprised of a first length of optical fiber which makes up optical fiber link 24. Optical fiber link 24 optically connects optical signal transmitter 12 to a receiver 30. In this embodiment, the signal is not amplified and is not actively repeatered between transmitter 12 and receiver 30.

Receiver 30 may comprise dispersion compensation modules and amplifiers, demultiplexers, and/or detectors.

An optical fiber span, as used herein, refers to a length of optical fiber which connects the optical transmitter to the receiver, or the optical transmitter to an amplifier, or a first amplifier to a second amplifier, or an amplifier to a receiver, and so forth. Optical fiber link 20 includes all of the fiber spans between the optical transmitter 12 and the receiver 30. Thus, in the embodiment illustrated in FIG. 1, the length of optical fiber span 26 makes up the length of optical fiber span 24.

Figure 2:
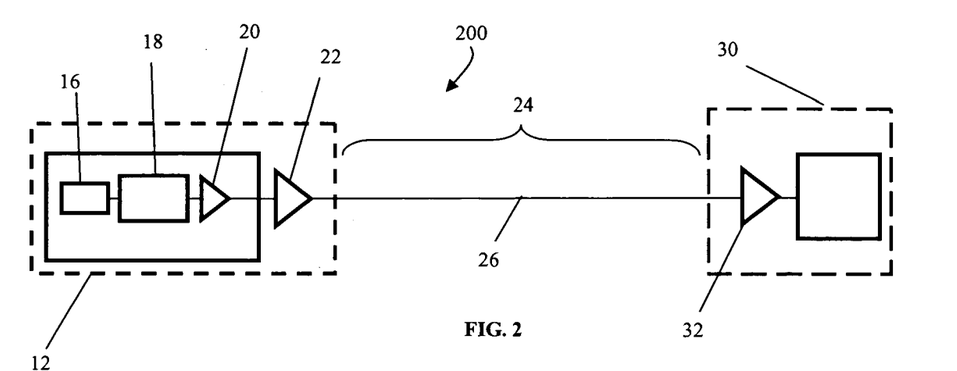
FIG. 2 schematically illustrates another preferred embodiment of a communications network for use in a system as disclosed herein comprising a dispersion compensating module.

FIG. 2 schematically illustrates another embodiment of a network 200 for use in a system wherein the link 24 comprises span 26 and receiver 30 which includes a dispersion compensating portion, such as a dispersion compensation module, comprised of an amplifier 32 and a dispersion compensating fiber (situated either before or after amplifier 32) which preferably has a dispersion of opposite dispersion sign at a respective wavelength compared to the dispersion sign of the fiber of span 26. Preferably, the dispersion compensating fiber has a negative dispersion at the respective wavelength. Thus, the signal is amplified in the receiver 30 by amplifier 32, and the dispersion compensating fiber is selected to compensate the dispersion of the link. In another embodiment, the optical loss introduced by the dispersion compensation module is restored by an EDFA.

Figure 3:
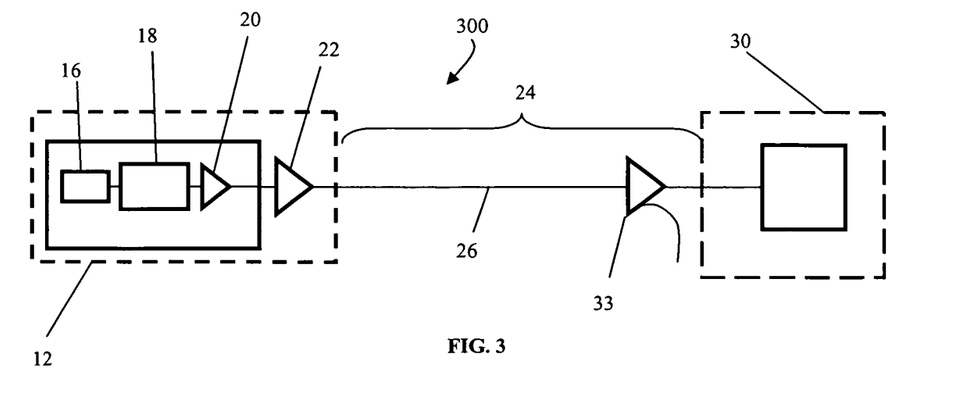
FIG. 3 schematically illustrates another preferred embodiment of a communications network for use in a system as disclosed herein comprising a Raman amplifier.

FIG. 3 schematically illustrates another embodiment of a network 300 for use in a system wherein the link 24 comprises span 26 and a Raman amplifier 33 (including Raman pump) located toward the receiver-end of the link 24.

Figure 4:
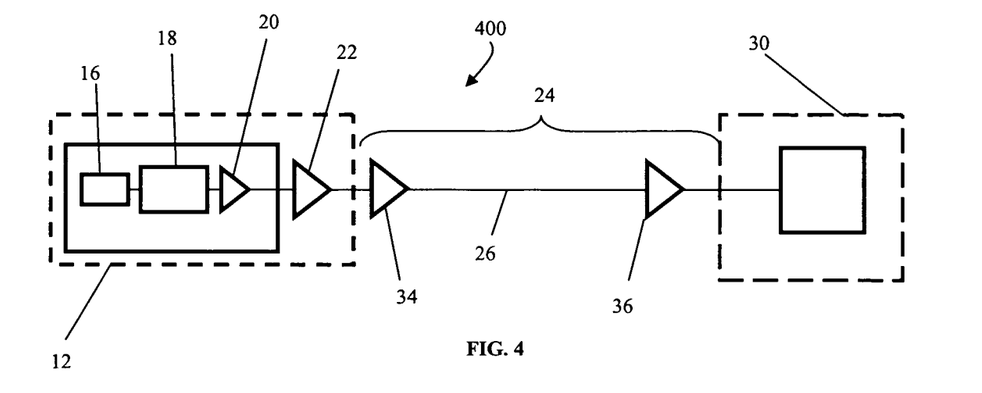
FIG. 4 schematically illustrates another preferred embodiment of a communications network for use in a system as disclosed herein comprising a ROPA located toward the receiver-end and a ROPA located toward the transmitter-end.

FIG. 4 schematically illustrates another embodiment of a network 400 for use in a system wherein the link 24 comprises span 26 and a ROPA located toward the receiver-end of the link 24 and a ROPA located toward the transmitter-end of the link 24.

Figure 5:
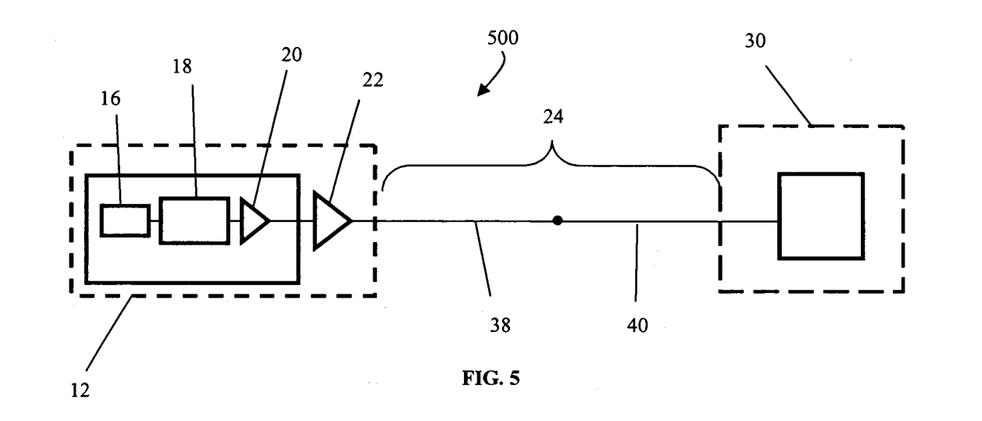
FIG. 5 schematically illustrates another preferred embodiment of a communications network for use in a system as disclosed herein comprising a span comprised of a first optical fiber portion and a second optical fiber portion connected in series.

FIG. 5 schematically illustrates another embodiment of a network 500 for use in a system wherein the link 24 comprises span 26, wherein the span comprises a first optical fiber and a second optical fiber connected in series. The first fiber has a first dispersion at an operating wavelength and the second fiber has a second dispersion at the same operating wavelength. Preferably, the first and second dispersions are of opposite dispersion sign. In one preferred embodiment, the first dispersion is positive and the second dispersion is negative. In another preferred embodiment, the first and second dispersions have the same sign but different magnitudes.

Figure 6:
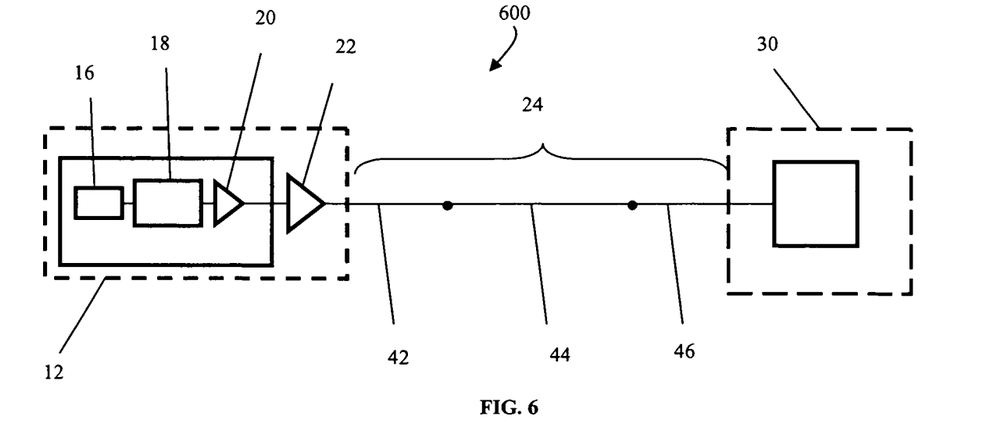
FIG. 6 schematically illustrates another preferred embodiment of a communications network for use in a system as disclosed herein comprising a span comprised of a first optical fiber portion, second optical fiber portion and third optical fiber portion connected in series.

FIG. 6 schematically illustrates another embodiment of a network 600 for use in a system wherein the link 24 comprises span 26, wherein the span comprises a first optical fiber, second optical fiber and third optical fiber, connected in series and having respective first, second and third dispersions at the same operating wavelength, wherein the first and third dispersions preferably have the same sign of dispersion at the same operating wavelength. The first and third fibers may have respective first and third dispersion slopes of the same sign at the same operating wavelength and the second fiber may have a second dispersion slope of sign opposite to the first or third fiber at the same operating wavelength.

Receiver 30 may then be connected to one or more additional optical fiber links which in turn may then be connected to an end user downstream.

Figure 7A:
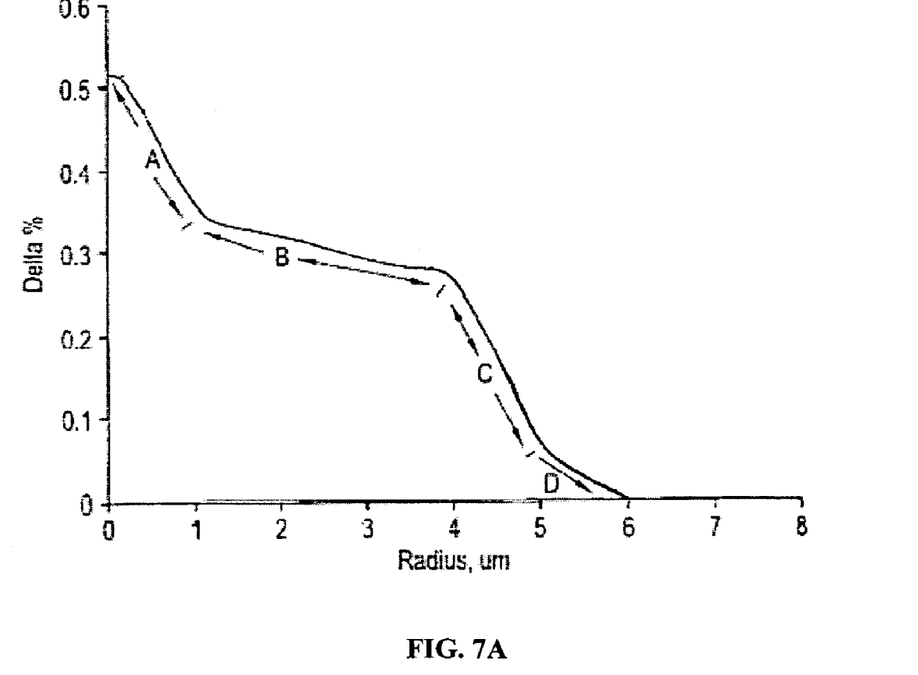
FIG. 7A is a schematic representation of the relative refractive index of an optical fiber suitable for use as disclosed herein.
Figure 7B:
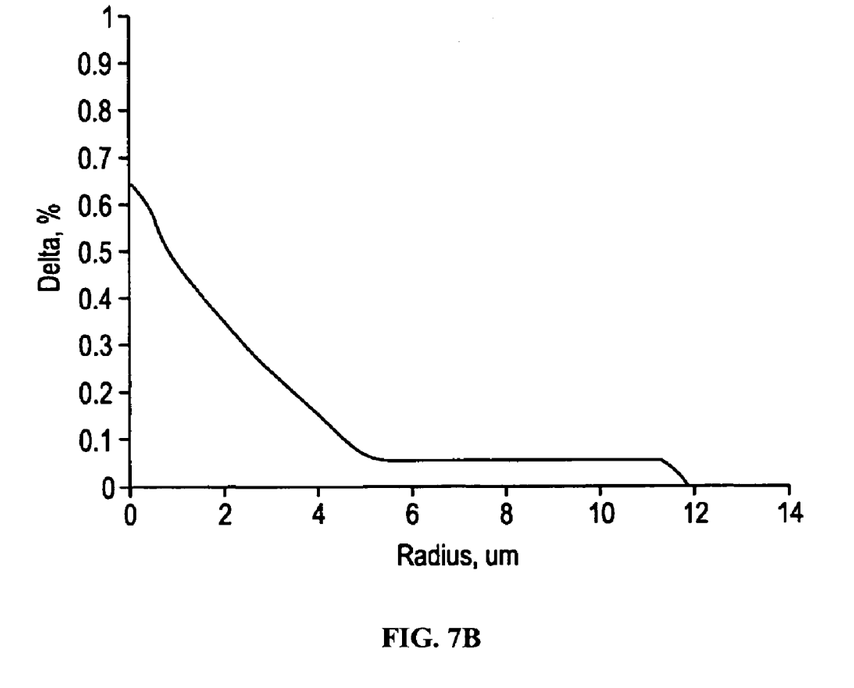
FIG. 7B is a schematic representation of the relative refractive index of another optical fiber suitable for use as disclosed herein.
Figure 7C:
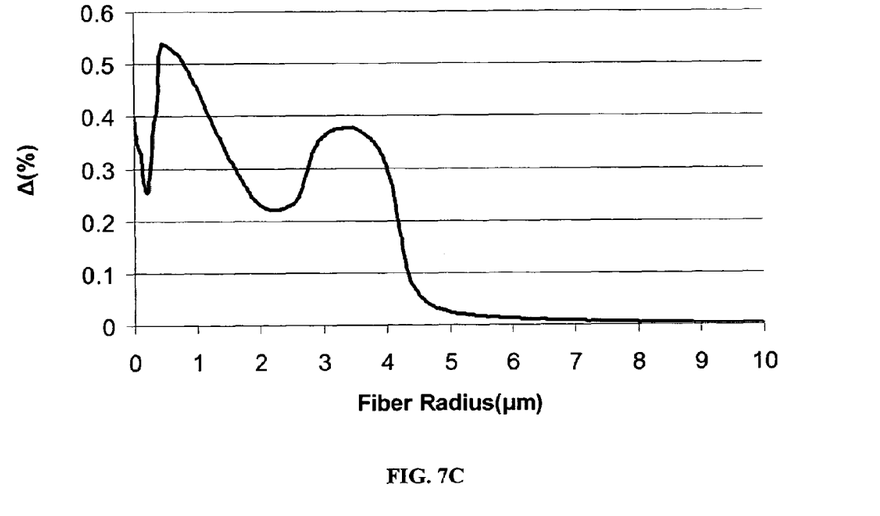
FIG. 7C is a schematic representation of the relative refractive index of yet another optical fiber suitable for use as disclosed herein.

Stimulated Brillouin scattering in the optical fiber link 24 is preferably suppressed in all of the systems disclosed herein by utilizing optical fiber such as that disclosed in U.S. Pat. No. 6,490,396, or in U.S. patent application Ser. No. 10/818,054, or in U.S. Provisional Patent Application Ser. No. 60/531,140, the specifications of which are hereby incorporated by reference. Fibers with high SBS thresholds and low attenuation are particularly well-suited for use in unrepeatered transmission systems. In particular, implementation of such fiber in the optical fiber span 26 enhances SBS suppression. Preferably, a high SBS threshold fiber is utilized to enable higher input powers that are above the level attainable by standard single mode fibers but below the SPM limit. In preferred embodiments, all of the optical fiber in the optical fiber link 24 is of the same optical fiber type. A schematic representation of the relative refractive index of one such preferred optical fiber that can be used is shown in FIG. 7A, which corresponds to FIG. 6 (A-B-C-D) of U.S. Pat. No. 6,490,396. A schematic representation of the relative refractive index of another such preferred optical fiber that can be used is shown in FIG. 7B, which corresponds to FIG. 2 of U.S. Pat. No. 6,490,396. The relative refractive index of another such preferred optical fiber that can be used is shown in FIG. 7C which corresponds to FIG. 15B of application Ser. No. 10/818,054. Utilization of such optical fiber allows higher optical launch power into the optical fiber link 24 and/or allows a greater optical path length of the optical fiber span 26 than was previously thought possible without incurring SBS signal impairments. The optical fiber path length may differ from the actual physical distance by which the optical transmitter and the receiver are separated, for example if the optical fiber or optical cable is at least partially coiled or folded or otherwise not fully extended in a straight line from the transmitter to the receiver. Such fibers can increase the SBS threshold by as much as an additional 6 dBm compared to standard single mode fiber, which can be sufficiently high to enable at least some high bit rate systems to operate without an artificial means of SBS suppression. However, other SBS suppression techniques could be used in conjunction with such fibers in order to increase the SBS threshold of the system even more. For example, the addition of binary (e.g. RZ) modulation to a cw signal increases the SBS threshold by 3 dB or more. By way of example, an increase in the SBS threshold by 3 dBm would directly increase the optical signal to noise ratio (OSNR) of the system by 3 dBm without making the system susceptible to SPM limitations. Such a 3 dBm improvement in OSNR generates a 3 dB increase in the system Q, which enables a 15 km increase in the span length (assuming a fiber loss of 0.2 dB/km).

The optical fibers illustrated in FIGS. 7A and 7B guide at least one optical mode and a plurality of acoustical modes, including an $L_{01}$ acoustical mode and an $L_{02}$ acoustical mode. The optical fiber comprises a core having a refractive index profile and a centerline and a cladding layer surrounding and directly adjacent the core. In a preferred embodiment, the core segment comprises a single core segment having a refractive index profile which decreases substantially continuously with radius. The effective area of the optical mode of such fibers at 1550 nm is greater than 80 $\mu m^2$, more preferably greater than 90 $\mu m^2$, and most preferably greater than 100 $\mu m^2$. The $L_{01}$ acoustical mode has a first acousto-optic effective area, $AOEA_{L01}$, not less than 160 $\mu m^2$, more preferably not less than 220 $\mu m^2$, and most preferably not less than 260 $\mu m^2$ at the Brillouin frequency of the optical fiber; the $L_{02}$ acoustical mode has a second acousto-optic effective area, $AOEA_{L02}$, not less than 160 $\mu m^2$, more preferably not less than 220 $\mu m^2$, and most preferably not less than 260 $\mu m^2$ at the Brillouin frequency of the optical fiber. Preferably, the relation of the L01 and L02 acoustic effective areas of the fibers are such that $0.4 < AOEA_{L01}/AOEA_{L02} < 2.5$.

The relative refractive index of the core preferably lies between an upper boundary curve and a lower boundary curve. The upper boundary curve is a straight line defined by at least two points, including a first upper point having a Δ of 0.6% at a radius of 0 and a second upper point having a Δ of 0% at a radius of 14.25 $\mu m$. The lower boundary curve is a straight line defined by at least two points, including a first lower point having a Δ of 0.25% at a radius of 0 and a second lower point having a Δ of 0% at a radius of 6 $\mu m$.

Preferably, $AOEA_{L01}$ and $AOEA_{L02}$ are not less than 160 $\mu m^2$ at the Brillouin frequency of the optical fiber. More preferably, $AOEA_{L01}$ and $AOEA_{L02}$ are not less than 220 $\mu m^2$ at the Brillouin frequency of the optical fiber.

Dispersion accumulates over the length of an optical fiber, and for longer span lengths the accumulated dispersion may reach undesirably high levels for various systems. For example, for a span length of 150 km and a fiber dispersion at 1550 nm of 17 ps/nm-km, the accumulated dispersion reaches about 2550 ps/nm at the end of the span. In some scenarios, a lower accumulated dispersion, and thus a lower fiber dispersion, may be desirable. However, reductions in fiber dispersion are typically accompanied by reductions in the fiber effective area below 80 $\mu m^2$, for which nonlinearities, such as SPM and SBS, become more pronounced. Reductions in fiber dispersion are also typically accompanied by an increase in attenuation at the signal wavelength, and this results in an undesirable increase in the total loss over longer span lengths. An optical communications system is disclosed herein comprising an unrepeatered optical fiber span having relatively low dispersion, relatively large effective area, low attenuation, and a high SBS threshold.

The optical fiber preferably exhibits a zero dispersion (or dispersion zero or $\lambda_o$) wavelength less than 1480 nm, more preferably less than 1400 nm. In some preferred embodiments, the optical fiber has a zero dispersion between 1340 and 1480 nm. In other preferred embodiments, the optical fiber has a zero dispersion at a wavelength below 1320 nm, more preferably in the range between 1290 and 1320 nm.

In some preferred embodiments, the optical fiber has a dispersion greater than 10 ps/nm-km at 1550 nm. Preferably, the optical fiber has a dispersion of between 10 and 21 ps/nm-km at a wavelength of 1550 nm. In some preferred embodiments, the optical fiber has a dispersion of between 15 and 18 ps/nm-km at a wavelength of 1550 nm. In other preferred embodiments, the optical fiber has a dispersion of between 18 and 20 ps/nm-km at a wavelength of 1550 nm. In still other preferred embodiments, the optical fiber has a dispersion of between 10 and 15 ps/nm-km at a wavelength of 1550 mm.

In other preferred embodiments, the optical fiber has a dispersion less than 10 ps/nm-km at 1550 nm. In still other preferred embodiments, the optical fiber has a dispersion less than 0 ps/nm-km at 1550 nm.

In preferred embodiments, the optical fiber has an optical effective area at 1550 nm of greater than 80 $\mu m^2$. In other preferred embodiments, the optical fiber has an optical effective area of greater than 90 $\mu m^2$. In still other preferred embodiments, the optical fiber has an optical effective area of greater than 100 $\mu m^2$.

Preferably the optical fiber has pin array bending loss at 1550 nm of less than 15 dB, more preferably less than 10 dB.

In some preferred embodiments, the upper boundary curve is a straight line defined by at least two points, including a first upper point having a Δ of 0.5% at a radius of 0 and a second upper point having a Δ of 0% at a radius of 11.25 $\mu m$;

In preferred embodiments, the core comprises a first portion extending from the centerline to a radius of 1 $\mu m$, the first portion having a relative refractive index greater than 0.25% and less than 0.5%.

Preferably, $d\Delta/dR > -0.15\%/\mu m$ for all radii from r=0 to r=1 μm. Preferably, the absolute magnitude of the difference between $\Delta(r=0 \mu m)$ and $\Delta(r=1 \mu m)$ is less than 0.1%.

The core further preferably comprises a second portion surrounding and directly adjacent to the first portion, the second portion extending to a radius of 2.5 μm and having Δ between 0.20% and 0.45%. In preferred embodiments, the second portion has a Δ between 0.3% and 0.45% for all radii between 1 and 1.5 μm. In other preferred embodiments, the second portion has a Δ between 0.2% and 0.35% for all radii between 1.5 and 2.5 μm.

The core further preferably comprises a third portion surrounding and directly adjacent to the second portion, the third portion extending to a radius of 4.5 μm and having Δ between 0.15% and 0.35%. In preferred embodiments, the third portion has a Δ between 0.2% and 0.3% for all radii between 2.5 and 4.5 μm.

Preferably, the absolute magnitude of the difference in Δ between any radii in the third portion is less than 0.1%.

Preferably, the absolute magnitude of the difference in Δ between any radii between r=2.5 μm and r=4.5 μm is less than 0.1%.

The core further preferably comprises a fourth portion surrounding and directly adjacent to the third portion, the fourth portion extending to a radius of 6 μm and having Δ between 0.1% and 0.3%. In preferred embodiments, the fourth portion has a Δ between 0.2% and 0.3% for all radii between 4.5 and 5 μm. In other preferred embodiments, the fourth portion has a Δ between 0.15% and 0.3% for all radii between 5 and 6 μm.

The core segment further preferably comprises a fifth portion surrounding and directly adjacent to the fourth portion, the fifth portion extending to a radius of 9 μm and having Δ between 0.0% and 0.15%.

In preferred embodiments, $\Delta(r=5.5 \mu m) > 0.1\%$. Preferably, $\Delta(r=6 \mu m) > 0\%$.

In preferred embodiments, $A_{L01}$ and $A_{L02}$ are less than 400 μm².

In preferred embodiments, $0.5 < AOEA_{L01}/AOEA_{L02} < 2$, more preferably $0.6 < AOEA_{L01}/AOEA_{L02} < 1.5$.

Preferably, the outermost radius of the core, $r_{CORE}$, is greater than 6 μm, more preferably greater than 6 μm and less than 15 μm, even more preferably greater than 6 μm and less than 12 μm. In preferred embodiments, $r_{CORE}$ is between 6 μm and 10 μm.

In other preferred embodiments, the optical fiber comprises: a length; a core having a refractive index profile and a centerline, the core comprising a central region having a maximum relative refractive index $\Delta_{1MAX}$, an intermediate region surrounding and directly adjacent the central region, the intermediate region having a minimum relative refractive index $\Delta_{2MIN}$, and an outer region surrounding and directly adjacent the intermediate region, the outer region having a maximum relative refractive index $\Delta_{3MAX}$, wherein $\Delta_{1MAX} > \Delta_{2MIN}$ and $\Delta_{3MAX} > \Delta_{2MIN}$; and a cladding layer surrounding and directly adjacent the core; wherein the optical fiber has an attenuation at 1550 nm; wherein the refractive index of the core is selected to provide an absolute SBS threshold in dB greater than about $9.3 + \log[(1-e^{-(0.19)(50)/4.343})/(1-e^{-(\alpha)(L)/4.343})]$, wherein L is the length in km and α is the attenuation in dB/km at 1550 nm, for a narrow linewidth cw source. Preferably, the refractive index of the core is selected to provide an optical effective area at 1550 nm greater than 80 μm². Preferably, the refractive index of the core is selected to provide a zero dispersion wavelength below 1400 nm. Preferably, the refractive index of the core is selected to provide a dispersion of greater than 15 ps/nm-km at a wavelength of 1550 nm. Preferably, the refractive index of the core is selected to provide a dispersion slope at 1550 nm of less than 0.07 ps/nm²-km. In preferred embodiments, $\Delta_{1MAX} > 0.4\%$. Preferably, the absolute SBS threshold in dB greater than about $9.5 + \log[(1-e^{-(0.19)(50)/4.343})/(1-e^{-(\alpha)(L)/4.343})]$, for a narrow linewidth cw source. Preferably, the attenuation at 1550 nm is less than 0.23 dB/km, more preferably less than 0.22 dB/km, even more preferably less than 0.21 dB/km, still more preferably less than 0.2 dB/km. Preferably, $\Delta_{1MAX} > 0$, $\Delta_{3MAX} > 0$, and $\Delta_{2MIN} > 0$. Preferably, the refractive index of the entire core relative to the cladding is greater than 0. Preferably, $|\Delta_{1MAX} - \Delta_{2MIN}| > 0.25\%$, more preferably $\Delta_{1MAX} - \Delta_{2MIN} > 0.25\%$. Preferably, $\Delta_{2MIN} < 0.4\%$, more preferably $\Delta_{2MIN}$ is between 0.1 and 0.4%. In some preferred embodiments, $\Delta_{2MIN}$ is between 0.1 and 0.3%. In other preferred embodiments, $\Delta_{2MIN}$ is between 0.2 and 0.3%. Preferably, $|\Delta_{3MAX} - \Delta_{2MIN}| > 0.10\%$, more preferably $\Delta_{3MAX} - \Delta_{2MIN} > 0.10\%$. In preferred embodiments, $\Delta_{1MAX} > 0.4\%$, $\Delta_{1MAX} - \Delta_{2MIN} > 0.25\%$, $\Delta_{2MIN}$ is between 0.1 and 0.4%, and $\Delta_{3MAX} - \Delta_{2MIN} > 0.10\%$.

In other preferred embodiments, the optical fiber comprises a core having a refractive index profile and a centerline and a cladding layer surrounding and directly adjacent the core. The core comprises a plurality of segments, preferably three segments that include a central segment, a moat segment, and a ring segment. Preferably, the core comprises a maximum relative refractive index greater than 0.75%. The refractive index of the core is selected to provide an optical effective area at 1550 nm greater than 80 μm²; a dispersion at 1550 nm having an absolute magnitude greater than 10 ps/nm-km; and an absolute SBS threshold (in dB) greater than about 10 $dB + \log[(1-e^{-(0.19)(50)/4.343})/(1-e^{-(\alpha)(L)/4.343})]$ for a given fiber length, L in km, and a given attenuation, α in dB/km, of the optical fiber, as determined using a continuous wave light source, preferably having a spectral width of less than about 150 kHz. Preferably, the optical fiber has a zero dispersion at a wavelength less than 1450 nm, In preferred embodiments, the zero-dispersion is less than 1400 nm. Preferably, the attenuation at 1550 nm is less than 0.23 dB/km, more preferably less than 0.21 dB/km. Embodiments having an absolute SBS threshold greater than about $11 + \log[(1-e^{-(0.19)(50)/4.343})/(1-e^{-(\alpha)(L)/4.343})]$ dB, as well as embodiments greater than about $12 + \log[(1-e^{-(0.19)(50)/4.343})/(1-e^{-(\alpha)(L)/4.343})]$ dB, for a narrow linewidth cw source, are also disclosed herein. Preferably, the acousto-optic effective area, $AOEA_{L01}$, of the $L_{01}$ acoustical mode is not less than 200 μm² at the Brillouin frequency of the optical fiber. Preferably, the acousto-optic effective area, $AOEA_{L02}$, of the $L_{02}$ acoustical mode is not less than 200 μm² at the Brillouin frequency of the optical fiber. More preferably, both $AOEA_{L01}$ and $AOEA_{L02}$ are not less than 200 μm² at the Brillouin frequency of the optical fiber. In preferred embodiments, the optical effective area is between 80 and 120 μm². In other preferred embodiments, the optical effective area is between 90 and 1101 m². In one set of preferred embodiments, the optical fiber has a core having a refractive index profile and a centerline, and having a cladding layer surrounding and directly adjacent the core, wherein the refractive index of the core is selected to provide an optical effective area at 1550 nm greater than 80 μm², a zero dispersion less than 1500 nm; and an absolute SBS threshold in dB greater than about $10 + \log[(1-e^{-(0.19)(50)/4.343})/(1-e^{-(\alpha)(L)/4.343})]$, wherein L is the length in km and α is the attenuation at 1550 nm, for a narrow linewidth cw source.

In one set of preferred embodiments, the optical fiber has dispersion at 1550 nm of between 10 and 15 ps/nm-km.

Preferably the optical fiber described and disclosed herein allows suitable performance at a plurality of operating wavelength windows between about 1260 nm and about 1650 nm. More preferably, the optical fiber described and disclosed herein allows suitable performance at a plurality of wavelengths from about 1260 nm to about 1650 nm. In a preferred embodiment, the optical fiber described and disclosed herein is a dual window fiber which can accommodate operation in at least the 1310 nm window and the 1550 nm window.

Reference will now be made in detail to the present preferred embodiments of the invention, examples of which are illustrated in the accompanying drawings.

While the fibers in U.S. Pat. No. 6,490,396 and in U.S. patent application Ser. No. 10/818,054 are preferred, other fibers could also be employed. Preferably, the optical fiber for the optical fiber span 26 (including its length) is selected such that the SBS threshold of the fiber satisfies the following inequality:

$$P_{th} > \frac{\alpha A_{eff}}{g_B} \gamma_B \quad (1)$$

$$\text{wherein } g_B = \frac{\tilde{g}_B(v)}{K(1 + \Delta v / \Delta v_B)},$$

$\tilde{g}_B(v)$ is Brillouin gain coefficient measured in m/W, $1 \leq K \leq 2$ is the polarization factor, $\Delta v$ and $\Delta v_B$ are the full widths at half maximum (FWHM) of the laser source and of the Brillouin gain, respectively; wherein $\alpha$ is the fiber loss coefficient (attenuation), and $A_{eff}$ is the fiber's effective area; wherein the dimensionless parameter $\gamma_B$ is found as a solution of equation (1)

$$\frac{\exp[-\gamma_B(1 - e^{-\alpha L})]}{\left(\frac{1}{\gamma_B} + e^{-\alpha L}\right)} \gamma_B^{3/2} \sqrt{1 - e^{-\alpha L}} = C; \quad (2)$$

wherein L is the fiber length and the constant C is given by $$C = \sqrt{\pi} \, kT \frac{v_s}{V_a} \Delta v_B \frac{g_B}{\alpha A_{eff}}; \quad (3)$$

and wherein T is the fiber temperature, k is the Boltzmann constant, $v_s$ is the signal frequency, and $v_a \approx 11$ GHz is the frequency difference between the Stokes wave and the signal wave. See *J. Lightwave Technol.*, vol. 20, pp. 1635-1643, (2002).

Figure 8:
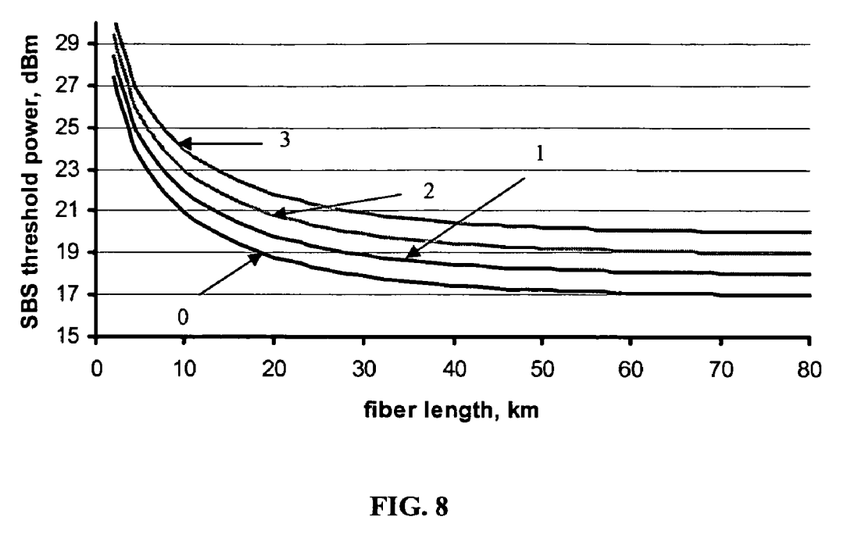
FIG. 8 shows a graphical representation of the SBS threshold versus fiber length of optical fiber suitable for use as disclosed herein.

FIG. 8 shows the calculated SBS threshold plotted versus optical fiber path length for optical fibers with different inherent SBS thresholds. The SBS-suppression capability of an analog source is typically quoted for a 50 km sample of standard single mode fiber, such as Corning SMF-28® fiber. These fibers typically have an SBS threshold that ranges from about 7 dBm with a CW narrow-linewidth source to approximately 10 dBm with a modulated source. Curve 0 in FIG. 8 corresponds to standard single mode fiber. Curves 1, 2 and 3 of FIG. 8 correspond to fibers having respective 1 dB, 2 dB and 3 dB increases in the SBS threshold of the fiber over standard single mode fiber.

Figure 9:
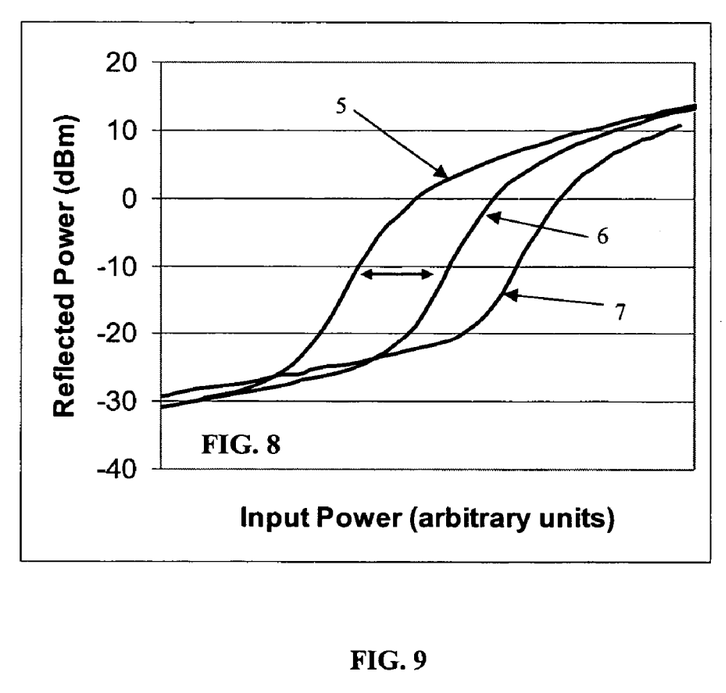
FIG. 9 shows the measured reflected power as a function of input power for three optical fibers having lengths of about 50 km.

FIG. 9 shows the measured reflected power as a function of input power for three optical fibers with lengths of about 50 km. Curve 5 corresponds to standard single mode fiber. Curves 6 and 7 correspond to fibers which exhibit SBS threshold increases above standard single mode fiber of 2.5 and 4 dBm, respectively, such as those disclosed in U.S. Pat. No. 6,490,396 and in U.S. patent application Ser. No. 10/818,054. For purposes of comparing curves 5, 6, and 7, the threshold in FIG. 9 is defined as the inflection point, which is about −10 dBm for these examples, or about 20 dBm above the Rayleigh level.

Preferably, the optical fiber in the optical fiber link 22 comprises an optical fiber having an SBS threshold that is at least 2 dB higher than that of standard single mode fiber, more preferably at least 3 dB higher, and even more preferably at least 4 dB higher.

Operation below the SBS threshold of the optical fiber in link 22 is preferred. Preferably, the maximum optical output power is about 1 dB below the actual SBS threshold of the optical fiber in the link 22. More preferably, the maximum optical output power is about 2 dB below the actual SBS threshold of the optical fiber in the link 22 because reflected power begins to increase below threshold.

In a first set of preferred embodiments, an optical communications system is disclosed herein comprising: an optical signal transmitter for generating an optical signal at an operating wavelength, wherein the signal is modulated at 10 Gb/s or higher; a receiver for receiving the optical signal; and, an optical fiber link coupling the transmitter and the receiver, the link comprising an optical fiber span comprising an optical fiber having an optical fiber path length greater than 100 km and a dispersion less than 15 ps/nm-km at 1550 nm. The transmitter has an average output power greater than 6 dBm per channel, and the optical fiber link has no active repeater.

In a preferred embodiment, the optical fiber has a dispersion of between about 10 to 15 ps/nm-km at the operating wavelength. In another preferred embodiment, the optical fiber has a zero-dispersion wavelength between 1340 and 1480 nm.

In a second set of preferred embodiments, an optical communications system is disclosed herein comprising: an optical signal transmitter for generating an optical signal at an operating wavelength, wherein the signal is modulated at a bit rate of 10 Gb/s or higher; a receiver for receiving the optical signal; and, an optical fiber link coupling the transmitter and the receiver, the link comprising an optical fiber span comprising an optical fiber having an optical fiber path length greater than 100 km and a zero-dispersion wavelength between 1340 and 1480 nm. The transmitter has an average output power greater than 6 dBm per channel, and, the optical fiber link has no active repeater.

In a preferred embodiment, the optical fiber has a dispersion of less than about 15 ps/nm-km at the operating wavelength. In another preferred embodiment, the optical fiber has a dispersion of between about 10 to 15 ps/nm-km at the operating wavelength.

In a third set of preferred embodiments, an optical communications system is disclosed herein comprising: an optical signal transmitter for generating an optical signal at an operating wavelength, wherein the signal is modulated at 10 Gb/s or higher; a receiver for receiving the optical signal; and an optical fiber link coupling the transmitter and the receiver, the link comprising an optical fiber span comprising an optical fiber having an optical fiber path length greater than 100 km and an effective area greater than 90 $\mu m^2$ at 1550 nm, and preferably less than 150 $\mu m^2$ at 1550 nm. The transmitter has an average output power greater than 10 dBm per channel and the optical fiber link has no repeater attached thereto, nor optically coupled thereto. The system is capable of carrying one signal at one wavelength or a plurality of signals at different wavelengths.

In a fourth set of preferred embodiments, an optical communications system is disclosed herein comprising: an optical signal transmitter for generating an optical signal modulated at 10 Gb/s or higher; a receiver for receiving the optical signal; and, an optical fiber link coupling the transmitter and the receiver, the link comprising an optical fiber span comprising an optical fiber exhibiting an $L_{01}$ acoustical mode having a first acousto-optic effective area, $AOEA_{L01}$, not less than 160 µm² and an $L_{02}$ acoustical mode having a second acousto-optic effective area, $AOEA_{L02}$, not less than 160 µm², both of said first and second acousto-optic effective areas measured at the Brillouin frequency of the optical fiber, wherein the link has no active repeater. In some preferred embodiments, the optical fiber has an optical fiber path length greater than 100 km. In other preferred embodiments, the optical fiber has an optical fiber path length greater than 150 km. In still other preferred embodiments, the optical fiber has an optical fiber path length greater than 200 km. Preferably, the optical fiber has an effective area greater than 80 µm² at 1550 nm, more preferably greater than 90 µm² at 1550 nm, and even more preferably greater than 100 µm² at 1550 nm. Preferably, the optical amplifier has an average output power greater than 6 dBm per channel.

In a fifth set of preferred embodiments, an optical communications system is disclosed herein comprising: an optical signal transmitter for generating an optical signal at an operating wavelength, wherein the signal is modulated at a bit rate of 10 Gb/s or higher; a receiver for receiving the optical signal; and an optical fiber link coupling the transmitter and the receiver, the link comprising an optical fiber span comprising an optical fiber having an optical fiber path length greater than 100 km; wherein the system contains no external phase modulator driven at a frequency different than the bit rate; wherein the transmitter has an average output power greater than 6 dBm per channel; and wherein the optical fiber link has no active repeater.

In a sixth set of preferred embodiments, a method of optical communication is disclosed herein comprising: generating a plurality of optical signals at a plurality of respective operating wavelengths, the signals being modulated at 10 Gb/s or higher, the signals having an average power of greater than 6 dBm per channel; and delivering the optical signals to a receiver via an optical fiber span without electronically conditioning the signal between the transmitter and the receiver, wherein the span comprises an optical fiber having an optical fiber path length greater than 100 km, and wherein the at least one of the signals is not driven at a frequency different than the bit rate. In one preferred embodiment, none of the signals is driven at a frequency different than the bit rate.

With regard to any of the sets of preferred embodiments, additional preferred embodiments include the following.

In preferred embodiments, the fiber exhibits an $L_{01}$ acoustical mode having a first acousto-optic effective area, $AOEA_{L01}$, not less than 160 µm², and an $L_{02}$ acoustical mode having a second acousto-optic effective area, $AOEA_{L02}$, not less than 160 µm², both of said first and second acousto-optic effective areas measured at the Brillouin frequency of the optical fiber. More preferably, $AOEA_{L01}$ is not less than 180 µm² and $AOEA_{L02}$ is not less than 180 µm². Even more preferably, $AOEA_{L01}$ is not less than 200 µm² and $AOEA_{L02}$ is not less than 200 µm². Still more preferably, $AOEA_{L01}$ is not less than 220 µm² and $AOEA_{L02}$ is not less than 220 µm². Yet still more preferably, $AOEA_{L01}$ is not less than 260 µm² and $AOEA_{L02}$ is not less than 260 µm².

Preferably, the relation of the L01 and L02 acoustic effective areas of the fiber is such that $0.4 < AOEA_{L01}/AOEA_{L02} < 2.5$, more preferably $0.5 < AOEA_{L01}/AOEA_{L02} < 2$, even more preferably $0.7 < AOEA_{L01}/AOEA_{L02} < 1.5$.

In a preferred embodiment, the fiber has a dispersion of between about 10 to 15 ps/nm-km at the operating wavelength.

Preferably, the optical fiber has an attenuation less than 0.200 dB/km at 1550 nm, more preferably less than 0.195 dB/km at 1550 nm, and even more preferably less than 0.190 dB/km at 1550 nm.

In some preferred embodiments, the signal is modulated at 20 Gb/s or higher. In other preferred embodiments, the signal is modulated at 40 Gb/s or higher.

Preferably, the optical fiber has an effective area greater than 80 µm² at 1550 nm, more preferably greater than 90 µm² at 1550 nm, and even more preferably greater than 100 µm at 1550 nm.

In some preferred embodiments, the transmitter has an average output power greater than 8 dBm per channel. In other preferred embodiments, the transmitter has an average output power greater than 10 dBm per channel. In still other preferred embodiments, the transmitter has an average output power greater than 12 dBm per channel. In other preferred embodiments, the transmitter has an average output power greater than 14 dBm per channel.

In a preferred embodiment, the system contains no external phase modulator driven at a frequency different than the bit rate.

In a preferred embodiment, the optical signal transmitter comprises a source having a linewidth less than 20 MHz. In another preferred embodiment, the optical transmitter comprises a source having a linewidth less than 10 MHz.

In one preferred embodiment, the optical signal transmitter comprises a source comprising a laser driven by a laser current, and the laser current is not directly modulated.

In preferred embodiments, the transmitter comprises a source. The transmitter may further comprise a modulator, and/or a pre-amplifier, optically coupled to the transmitter. The transmitter also comprises a post-amplifier which is an optical amplifier, such as an EDFA, optically coupled to the link. Preferably, the optical amplifier is a two-stage optical amplifier. In some preferred embodiments, the optical amplifier comprises a pre-amplification stage, a mid-stage, and a second amplification stage. The transmitter may also comprise a multiplexer.

Preferably, at least one operating wavelength is between about 1525 nm to 1565 nm, although one or more operating wavelengths may reside in other operating wavelength ranges. In preferred embodiments, the operating wavelength is about 1550 nm.

Preferably, the accumulated dispersion at the optical amplifier is less than 0 ps/nm at the operating wavelength.

In some preferred embodiments, the signal is not amplified in the link. In other preferred embodiments, no Raman amplifier is coupled to the link. In still other preferred embodiments, no ROPA is coupled to the link. In other preferred embodiments, no Raman amplifier and no ROPA are coupled to the link.

In preferred embodiments, the link has an optical fiber path length greater than 150 km and no Raman amplifier is coupled to the link; in other preferred embodiments with the 150 km link, no ROPA is coupled to the link; and in still other preferred embodiments with the 150 km link, no Raman amplifier and no ROPA are coupled to the link. In other preferred embodiments with the 150 km link, a Raman amplifier or a plurality thereof, and/or a ROPA or a plurality thereof, is/are coupled to the link.

In preferred embodiments, the link has an optical fiber path length greater than 200 km and no Raman amplifier is coupled to the link; in other preferred embodiments with the 200 km link, no ROPA is coupled to the link. In still other preferred embodiments with the 200 km link, no Raman amplifier and no ROPA are coupled to the link. In other preferred embodiments with the 200 km link, a Raman amplifier or a plurality thereof, and/or a ROPA or a plurality thereof, is/are coupled to the link.

In another preferred embodiment, a Raman amplifier is optically coupled to the optical fiber link and the optical fiber path length is greater than 250 km.

In some preferred embodiments the system includes dispersion compensation, and the receiver 30 has a dispersion compensating portion coupled to the optical fiber span. The dispersion compensating portion comprises a dispersion compensating optical fiber having a dispersion at the operating wavelength which is lower than, and preferably opposite in sign to, the dispersion at the operating wavelength of the optical fiber in the optical fiber span. Preferably, the dispersion compensating portion of the receiver further comprises an optical amplifier, such as an EDFA, for amplifying the signal before the signal enters the dispersion compensating optical fiber.

In some preferred embodiments the system includes dispersion management, and the optical fiber span comprises first and second optical fiber portions connected in series arrangement, wherein the first fiber portion has a first dispersion at the operating wavelength and the second fiber portion has a second dispersion at the operating wavelength, wherein the second dispersion is lower than the first dispersion. Preferably, the first and second dispersions have opposite sign at the operating wavelength.

In some preferred embodiments, the system includes a span comprised of a first optical fiber portion having a dispersion at an operating wavelength greater than 10 ps/nm-km and a second optical fiber portion having a dispersion at the operating wavelength less than 10 ps/nm-km. In other preferred embodiments, the system includes a span comprised of a first optical fiber portion having a dispersion at an operating wavelength greater than 15 ps/nm-km and a second optical fiber portion having a dispersion at the operating wavelength less than 10 ps/nm-km. In still other preferred embodiments, the system includes a span comprised of a first optical fiber portion having a dispersion at an operating wavelength greater than 10 ps/nm-km and a second optical fiber portion having a dispersion at the operating wavelength less than 0 ps/nm-km.

In some preferred embodiments the system includes effective area management, and the optical fiber span comprises first and second optical fiber portions connected in series arrangement, wherein the first fiber portion has a first effective area at the operating wavelength and the second fiber portion has a second effective area at the operating wavelength, wherein the first and second effective area differ by more than 20 $\mu m^2$ at the operating wavelength. Such an arrangement is preferably with Raman pumping from the receiver end due to higher Raman gain of the second fiber portion.

In some other preferred embodiments the system includes dispersion management, and the optical fiber span comprises first, second, and third optical fiber portions connected in series arrangement, wherein the first fiber portion has a first dispersion at the operating wavelength, the second fiber portion has a second dispersion at the operating wavelength, and the third fiber portion has a third dispersion at the operating wavelength, wherein the first and third dispersion have the same dispersion sign at the operating wavelength, and wherein the first and second dispersions have opposite dispersion sign at the operating wavelength. For such embodiments that utilize Raman amplification, the link further preferably comprises a Raman amplifier coupled to the first optical fiber portion or the third optical fiber portion, particularly when the optical fiber portion has a relatively large effective area as compared to other optical fiber portions in the span.

In preferred embodiments, the optical transmitter transmits a plurality of optical signals at a plurality of operating wavelengths in at least one operating wavelength range, the optical signals being modulated at 10 Gb/s or higher and transmitted on respective channels. In some preferred embodiments, the system is capable of transmitting signals with a channel spacing of 200 GHz or less.

In some preferred embodiments, optical signals are modulated at 20 Gb/s or higher, preferably with a channel spacing of 200 GHz or less. In other preferred embodiments, optical signals are modulated at 40 Gb/s or higher, preferably with a channel spacing of 200 GHz or less.

An optical communications system is also disclosed herein comprising: an optical transmitter for generating an optical signal modulated at 10 Gb/s or higher; a receiver for receiving the optical signal; and, an unrepeatered optical fiber link coupling the transmitter and the receiver, the link comprising an optical fiber span comprising an optical fiber exhibiting an $L_{01}$ acoustical mode having a first acousto-optic effective area, $AOEA_{L01}$, not less than 160 $\mu m^2$ and an $L_{02}$ acoustical mode having a second acousto-optic effective area, $AOEA_{L02}$, not less than 160 $\mu m^2$, both of said first and second acousto-optic effective areas measured at the Brillouin frequency of the optical fiber. In preferred embodiments, the relation of the L01 and L02 acoustic effective areas of the fiber is such that $0.4 < AOEA_{L01}/AOEA_{L02} < 2.5$.

A method of optical communication is also disclosed herein, the method comprising: generating a plurality of optical signals at a plurality of respective operating wavelengths, the signals being modulated at 10 Gb/s or higher, the signals having an average power of greater than 6 dBm per channel; and delivering the optical signals to a receiver via an optical fiber span comprising an optical fiber having an optical fiber path length greater than 100 km and an effective area greater than 90 $\mu m^2$ at 1550 nm without repeating the signals between the transmitter and the receiver.

Another method of optical communication is disclosed herein, the method comprising: generating a plurality of optical signals at a plurality of respective operating wavelengths, the signals being modulated at 10 Gb/s or higher, the signals having an average power of greater than 10 dBm per channel; and delivering the optical signals to a receiver via an optical fiber span comprising an optical fiber having an optical fiber path length greater than 100 km and an effective area greater than 90 $\mu m^2$ at 1550 nm without electronically conditioning the signal between the transmitter and the receiver.

With regard to any of the above sets of preferred embodiments, operation of the system is preferably carried out with launch powers (or input powers) below the SPM limit or SPM threshold. Preferably, at least one optical signal is transmitted at a wavelength within an operating wavelength range between 1525 nm and 1625 nm. In preferred embodiments, the optical signal is transmitted at a wavelength between about 1525 and 1565 nm. In a preferred embodiment, the optical signal is transmitted at a wavelength of about 1550 nm.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical communications system comprising:
   an optical signal transmitter for generating an optical signal at an operating wavelength, wherein the signal is modulated at a bit rate of 10 Gb/s or higher;
   a receiver for receiving the optical signal; and,
   a repeaterless optical fiber link coupling the transmitter and the receiver, the link comprising an optical fiber span comprising an optical fiber having an optical fiber path length greater than 100 km, wherein said optical fiber link includes no optical amplifier(s) with electrical component(s) present in the location of said amplifier(s);
   wherein the system contains no external phase modulator driven at a frequency different than the bit rate;
   wherein the transmitter has an average output power greater than 6 dBm per channel and wherein said optical fiber link has no electrical component.

2. The system of claim 1 wherein the optical fiber has a dispersion of less than about 15 ps/nm-km at the operating wavelength.

3. The system of claim 1 wherein the optical fiber has a dispersion of between about 10 to 15 ps/nm-km at the operating wavelength.

4. The system of claim 1 wherein the optical fiber has a zero-dispersion wavelength between 1340 and 1480 nm.

5. The system of claim 1 wherein the optical fiber has an attenuation of less than 0.200 dB/km at 1550 nm.

6. The system of claim 1 wherein the signal is modulated at 20 Gb/s or higher.

7. The system of claim 1 wherein the optical fiber has an effective area greater than 80 $\mu m^2$ at 1550 nm.

8. The system of claim 1 wherein the transmitter has an average output power greater than 8 dBm per channel.

9. The system of claim 1 wherein the optical signal transmitter comprises a source having a linewidth less than 20 MHz.

10. The system of claim 1 wherein the optical signal transmitter comprises a source comprising a laser driven by a laser current, and the laser current is not directly modulated.

11. The system of claim 1 wherein the operating wavelength is between about 1525 nm to 1565 nm.

12. The system of claim 1 wherein the signal is not amplified in the link.

13. The system of claim 1 wherein no Raman amplifier is coupled to the link.

14. The system of claim 1 wherein no ROPA is coupled to the link.

15. The system of claim 1 wherein no Raman amplifier and no ROPA are coupled to the link.

16. The system of claim 1 further comprising a Raman amplifier optically coupled to the optical fiber link, wherein the optical fiber path length is greater than 250 km.

17. The system of claim 1 wherein the optical signal transmitter transmits a plurality of optical signals at a plurality of operating wavelengths in at least one operating wavelength range, wherein at least two signals are transmitted with a channel spacing of 200 GHz or less.

18. The system of claim 1 wherein the optical fiber has an optical fiber path length greater than 150 km.

19. The system of claim 1 wherein the optical fiber has an optical fiber path length greater than 200 km.

20. The system of claim 1 wherein the optical fiber has an effective area greater than 90 $\mu m^2$ at 1550 nm.

* * * * *